US006905115B2

(12) United States Patent
Kato

(10) Patent No.: US 6,905,115 B2
(45) Date of Patent: Jun. 14, 2005

(54) WORKPIECE ASSEMBLY JIG

(75) Inventor: Hiroshi Kato, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/609,525

(22) Filed: Jul. 1, 2003

(65) Prior Publication Data

US 2004/0119222 A1 Jun. 24, 2004

(30) Foreign Application Priority Data

Jul. 3, 2002 (JP) ........................................ 2002-194456

(51) Int. Cl.⁷ .............................................. B25B 11/00
(52) U.S. Cl. ............................. 269/17; 269/45; 269/60; 269/71; 269/37; 269/910; 29/281.1; 29/281.5
(58) Field of Search ............................ 269/37, 296, 45, 269/71, 60, 82–85, 17, 910; 254/139; 29/181.1, 181.5

(56) References Cited

U.S. PATENT DOCUMENTS 4,239,196 A * 12/1980 Hanger ........................ 269/17
5,139,233 A * 8/1992 Goss ............................ 269/17

* cited by examiner

Primary Examiner—Robert C. Watson
(74) Attorney, Agent, or Firm—Birch, Stewart, Kolasch & Birch, LLP

(57) ABSTRACT

A workpiece assembly jig is provided with a plurality of first brackets provided around the perimeter of an aluminum jig main body for mounting thereon and assembling a long aluminum workpiece. A plurality of second brackets are provided around the perimeter of a steel jig base and are connected together via connecting members having first and second male threaded portions extending in opposite directions from a middle flange. The first male threaded portion of the connecting member is screwed into a female threaded portion formed in the second bracket, and the second male threaded portion runs through a long hole formed longitudinally (perpendicular to the plane of the paper) in the first bracket which is secured between the flange and a nut.

20 Claims, 4 Drawing Sheets

WORKPIECE ASSEMBLY JIG

CROSS-REFERENCE TO RELATED APPLICATIONS

The present nonprovisional application claims priority under 35 USC 119 to Japanese Patent Application No. 2002-194456 filed on Jul. 3, 2002 the entire contents thereof is hereby incorporated by reference.

BACKGROUND OF THE INVENTION

1. Field of the Invention

The present invention relates to a workpiece assembly jig that includes an aluminum jig main body for mounting thereon and assembling a long aluminum workpiece, and a steel jig base supporting the jig main body from below.

2. Description of Background Art

A long aluminum workpiece such as an airplane main wing needs to be assembled on an aluminum jig which is formed of the same material as that of the workpiece, so as to prevent any deterioration in the precision of the assembly due to a difference in the coefficients of thermal expansion between the workpiece and the jig. However, if the entire jig is made of aluminum, not only does the cost greatly increase in comparison with a steel jig, but also the overall size of the jig is disadvantageously increased in order to provide rigidity. These problems can be expected to be solved by fixing an aluminum jig main body, which supports the workpiece, to a steel jig base.

However, when an aluminum jig main body is fixed to a steel jig base, there is a possibility that the jig main body might be distorted or warped due to a difference in the coefficients of thermal expansion between the jig main body and the jig base, thus degrading the precision of the assembly of the workpiece.

SUMMARY AND OBJECTS OF THE INVENTION

The present invention has been achieved in view of the above-mentioned circumstances, and it is an object of the present invention to provide a jig in which an aluminum jig main body and a steel jig base are combined wherein the distortion or warpage of the jig main body due to the difference in the coefficients of thermal expansion between aluminum and steel is compensated for.

In order to achieve the above object, in accordance with a first aspect of the present invention, there is proposed a workpiece assembly jig having an aluminum jig main body for mounting thereon and assembling a long aluminum workpiece, and a steel jig base supporting the jig main body from below. The workpiece assembly jig includes a plurality of first brackets provided around the perimeter of the jig main body and a plurality of second brackets provided around the perimeter of the jig base so as to face a lower surface of the first brackets. Connecting members are provided having first and second male threaded portions extending in opposite directions from a middle flange. The connecting members connect the first and second brackets. The first male threaded portion of the connecting member is screwed into a female threaded portion formed in one of the first and second brackets, and the second male threaded portion of the connecting member runs through a long hole longitudinally formed in the other of the first and second brackets which is secured between the flange of the connecting member and a nut screwed around the second male threaded portion.

With this arrangement, when connecting the first bracket provided on the jig main body and the second bracket provided on the jig base by means of the connecting member, by screwing the first male threaded portion of the connecting member into the female threaded portion formed in one of the first and second brackets, making the second male threaded portion of the connecting member run through the long hole formed in the other of the first and second brackets, and securing the other of the first and second brackets between the flange of the connecting member and the nut screwed around the second male threaded portion, the jig main body can be firmly supported on the jig base. In this process, the inclination of the jig main body relative to the jig base can be adjusted as desired by changing the extent to which the first male threaded portion of each of the connecting members is screwed in. Further, even when the jig main body and jig base thermally expand by different amounts in the longitudinal direction due to a change in temperature, since the second male threaded portions of the connecting members move within the long holes formed in the other of the first and second brackets, the difference in the amount of thermal expansion can be absorbed, thereby preventing distortion or warpage of the jig main body.

With this mechanism, the difference in the amount of thermal expansion between the jig main body and the jig base can be compensated for to ensure the flatness of the jig main body thereby improving the assembly precision of the workpiece, even when the jig base is made of inexpensive steel and only the jig main body for supporting the workpiece is made of aluminum to reduce the cost.

Furthermore, in accordance with a second aspect of the present invention, in addition to the first aspect, there is proposed a workpiece assembly jig wherein the long holes of the first brackets close to longitudinally opposite ends of the jig main body and the jig base are made longer than the long holes of the first brackets close to the longitudinal center.

With this arrangement, since the long holes of the first brackets close to longitudinally opposite ends of the jig main body and the jig base are made longer than the long holes of the first bracket close to the longitudinal center, even after the difference in the amount of thermal expansion between the jig main body and the jig base is absorbed, the displacement in the longitudinal relative positional relationship between the jig main body and the jig base can be minimized.

Moreover, in accordance with a third aspect of the present invention, in addition to the second aspect, there is proposed a workpiece assembly jig wherein the length of the long hole is set based on a difference in coefficients of thermal expansion between aluminum and steel as well as a predetermined difference in temperature.

With this arrangement, since the length of the long hole is set based on the difference in coefficients of thermal expansion between aluminum and steel as well as the predetermined difference in temperature, it is possible to prevent the second male threaded portion of the connecting member from interfering with an end of the long hole without making the length of the long hole longer than necessary.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
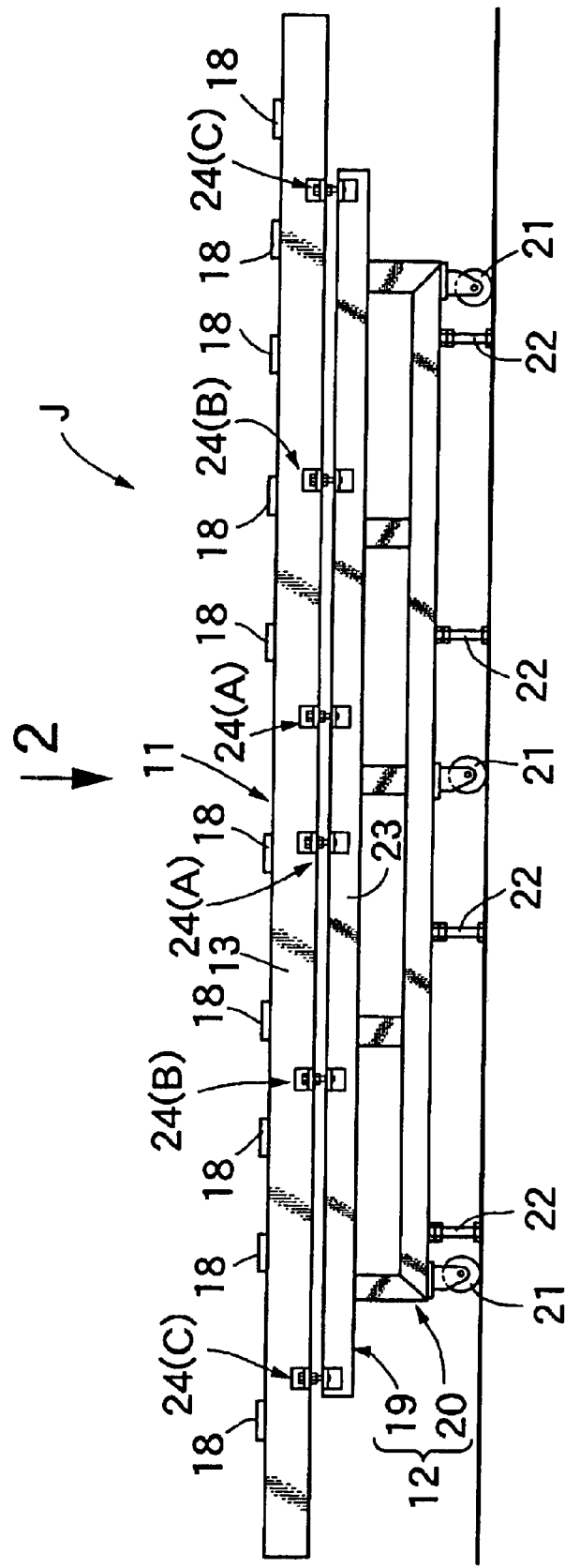
FIG. 1 is a side view of a main wing assembly jig.
Figure 2:
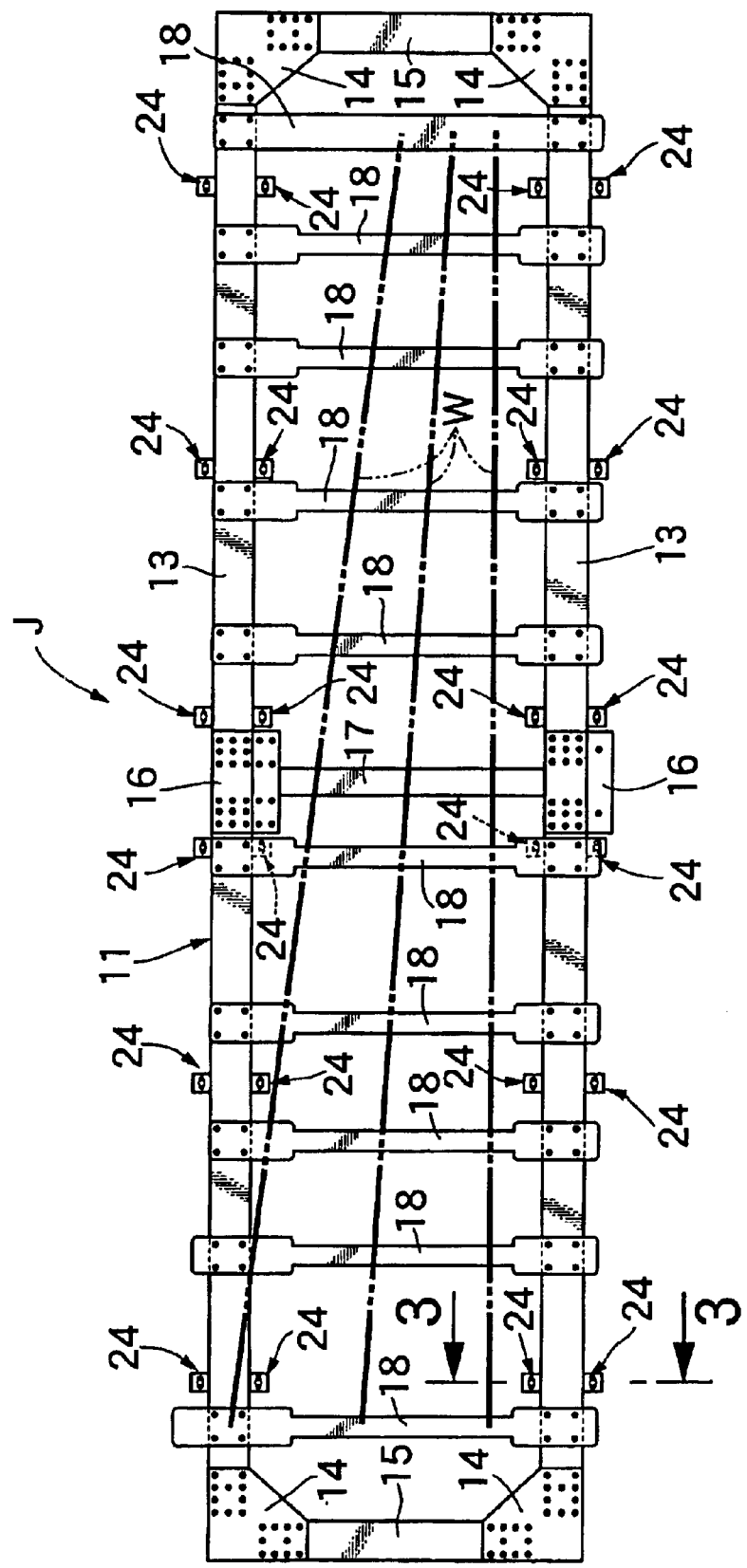
FIG. 2 is a view from arrow 2 in FIG. 1.

Referring to FIGS. 1 and 2, a jig J for assembling an airplane main wing as a long aluminum workpiece is formed from an aluminum jig main body 11, which is made of the same material as that of the workpiece, and a steel jig base 12 for supporting the jig main body 11 from below.

The jig main body 11 has a rectangular shape in plan view, and includes two longitudinal frames 13 extending in parallel in the longitudinal direction. Two lateral frames 15 are connected to opposite ends of the longitudinal frames 13 via connecting plates 14. One lateral frame 17 is connected to central parts of the longitudinal frames 13 via connecting plates 16. A plurality of workpiece support members 18 are disposed in parallel to the lateral frames 15; 17 so as to provide a connection between the two longitudinal frames 13. FIG. 2 shows a state in which a workpiece W comprising a front spar, a mid spar, and a rear spar forming the framework of an airplane main wing is fixed on top of the jig main body 11.

The jig base 12 includes a jig main body support 19 having a ladder structure and supporting the jig main body 11, and a carriage 20 supporting the jig main body support 19 from below. Provided on the lower face of the carriage 20 are six casters 21 for moving the jig J, and eight screw-type outriggers 22 for isolating the casters 21 from the floor to make the jig J stationary. The jig main body support 19 includes two longitudinal frames 23 extending in parallel beneath the two longitudinal frames 13 of the jig main body 11. The longitudinal frames 13 of the jig main body 11 are supported on top of the longitudinal frames 23 of the jig base 12 via a total of 24 support means 24 such that the positions of the longitudinal frames 13 can be freely adjusted.

Figure 3:
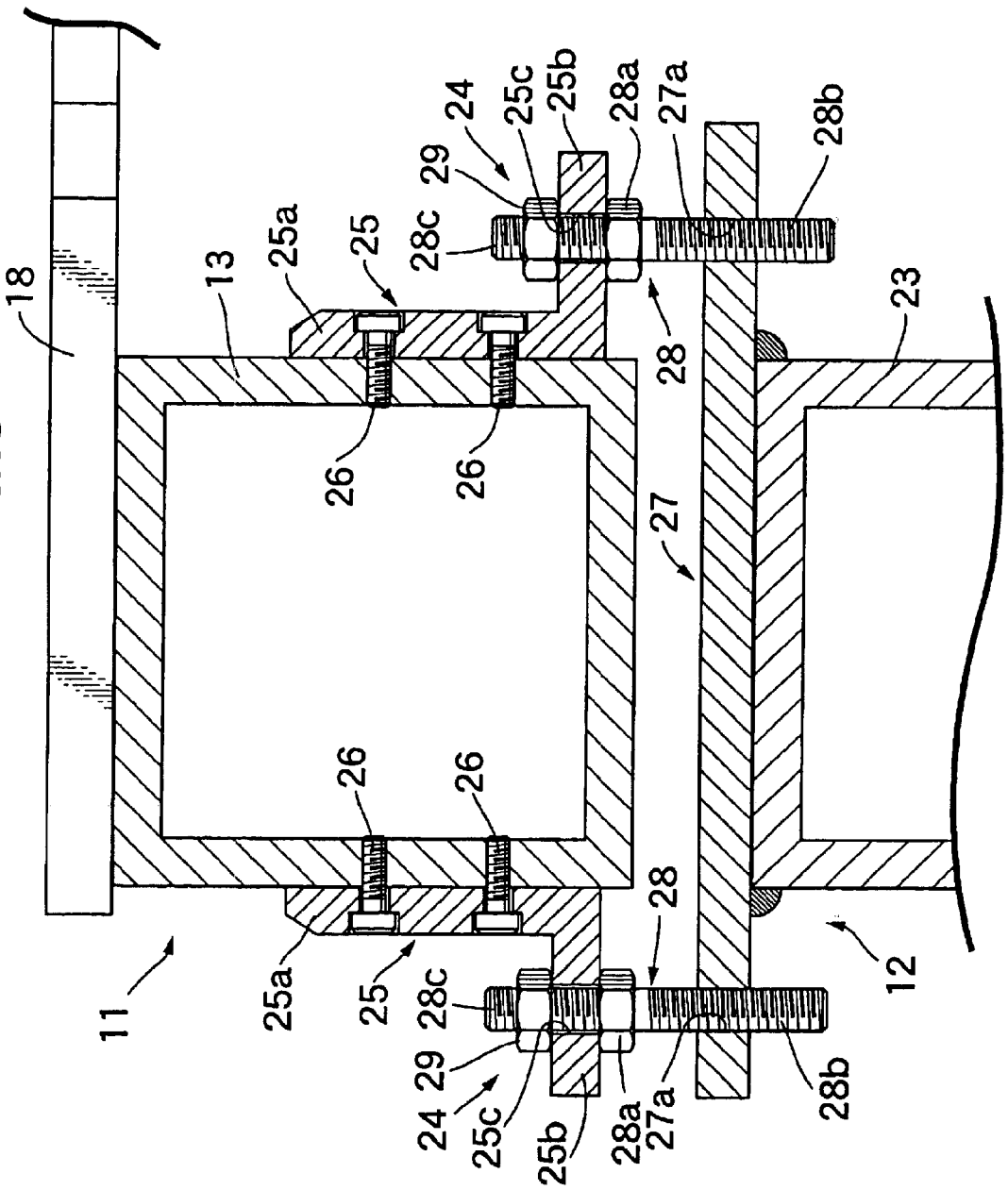
FIG. 3 is an enlarged cross section along line 3—3 in FIG. 2.
Figure 4:
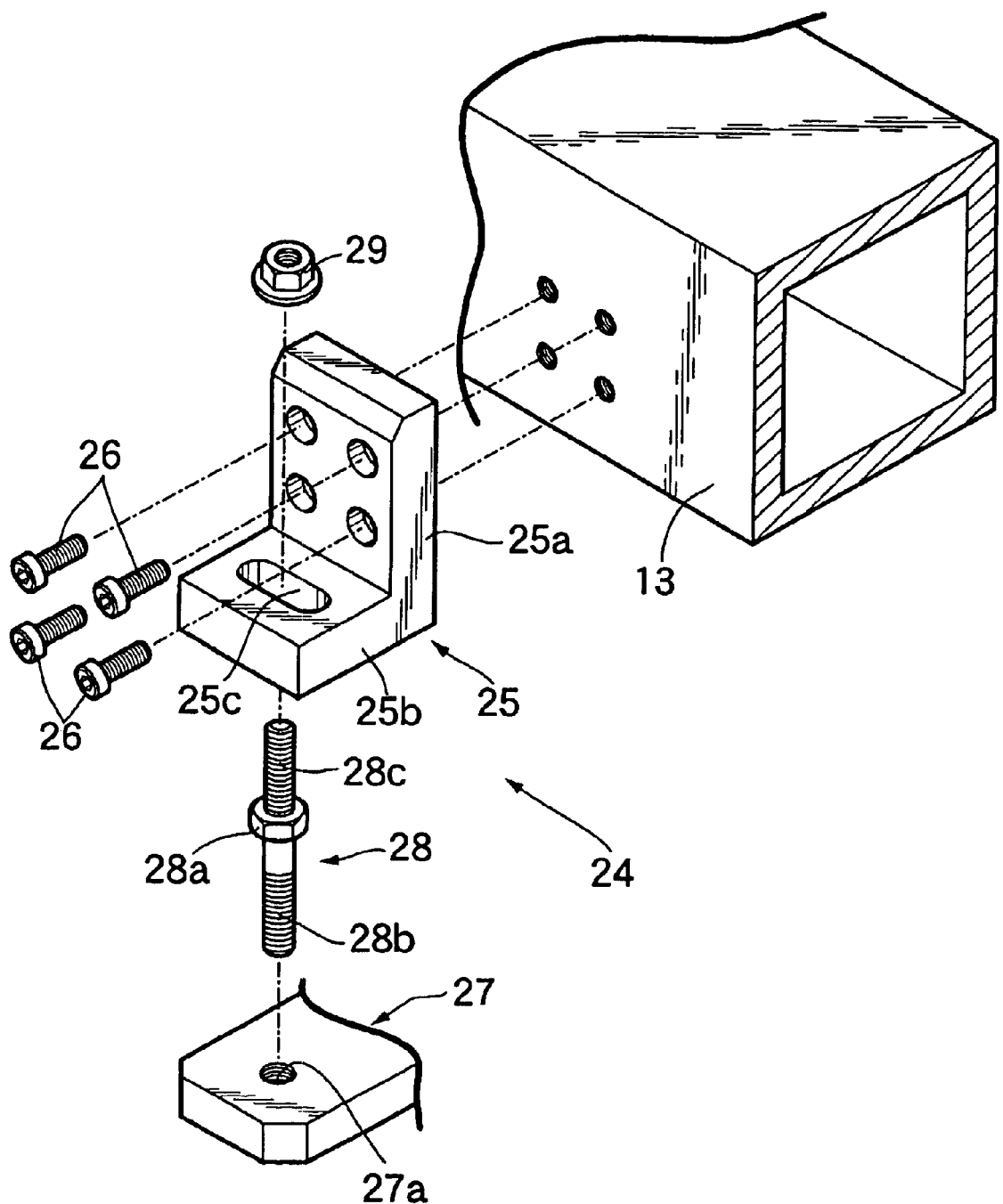
FIG. 4 is an exploded perspective view of the vicinity of a connecting member.

The 24 support means 24 all have the same structure, and two thereof are explained by reference to FIGS. 3 and 4.

The longitudinal frame 13 of the jig main body 11 is a member having a rectangular cross section. A vertical portion 25a of an L-shaped first bracket 25 is fixed to each of left and right side faces of the longitudinal frame 13 by means of four bolts 26. Formed in a horizontal portion 25b of the first bracket 25 is a long hole 25c extending in the longitudinal direction of the longitudinal frame 13. The longitudinal frame 23 of the jig base 12 is a member having a rectangular cross section. Female threaded portions 27a are formed at opposite ends of a plate-shaped second bracket 27 that is horizontally fixed on the upper surface of the longitudinal frame 23. A bolt-shaped connecting member 28 includes a hexagonal flange 28a in its middle, a first male threaded portion 28b that extends downwardly from the flange 28a to be screwed into the female threaded portion 27a of the second bracket 27, and a second male threaded portion 28c that extends upwardly from the flange 28a and runs through the long hole 25c of the first bracket 25 to be screwed into a nut 29.

The operation of the embodiment of the present invention having the above-mentioned arrangement is now explained.

To support the jig main body 11 on top of the jig base 12, after screwing the first male threaded portion 28b of the connecting member 28 of each of the support means 24 into the female threaded portion 27a of the second bracket 27 of the jig base 12 by an appropriate amount, the second male threaded portion 28c of the connecting member 28 is fitted into the long hole 25c of the first bracket 25 of the jig main body 11 while superimposing the jig main body 11 over the jig base 12, and the lower surface of the horizontal portion 25b of the first bracket 25 is made to abut against the upper surface of the flange 28a of the connecting member 28. In this state, engaging a wrench with the hexagonal flange 28a of each connecting member 28 and rotating it in a predetermined direction increases/decreases the height of the flange 28a to adjust the upper face of the jig main body 11 so that it becomes horizontal. The nut 29 is screwed around the second male threaded portion 28c of the connecting member 28 that runs upwardly through the long hole 25c of the first bracket 25, and the horizontal portion 25b of the first bracket 25 is fixed between the flange 28a of the connecting member 28 and the nut 29.

Since the aluminum jig main body 11 has a coefficient of thermal expansion higher than that of the steel jig base 12, there is a possibility that the position of the long hole 25c of first bracket 25 of the jig main body 11 might be displaced in the longitudinal direction of the jig J relative to the position of the female threaded portion 27a of the second bracket 27 of the jig base 12, but the difference in the coefficients of thermal expansion is absorbed by the second male threaded portion 28c of the connecting member 28 moving within the long hole 25c, thereby preventing any deterioration in the assembly precision of the workpiece W due to distortion or warpage of the jig main body 11 directly supporting the workpiece W.

Even when the temperature greatly differs between summer and winter, by simply loosening the nuts 29 before starting assembly of the workpiece W so as to adjust the relative positions between the second male threaded portions 28c and the long holes 25c, and then retightening the nuts 29, the distortion or warpage of the jig main body 11 can be easily and reliably corrected.

In FIG. 1, the lengths of the long holes 25c of the first brackets 25 are different among two support means 24(A) close to the center in the longitudinal direction of the jig J, two support means 24(B) outside the two support means 24(A) in the longitudinal direction, and two support means 24(C) close to the ends in the longitudinal direction. That is, the length of the long holes 25c of the first brackets 25 of the two support means 24(A) close to the center in the longitudinal direction is the shortest, and the length of the long holes 25c is increasing toward the support means 24(B) and the support means 24(C) close to the outside. This is because the relative displacement, with the center of the jig J as a reference, due to the difference in the coefficients of thermal expansion between the jig main body 11 and the jig base 12 is becoming larger toward the end parts of the jig J.

If the support means 24 is present in the center in the longitudinal direction of the jig J, the long hole 25c of the first bracket 25 of the support means 24 may be circular. Increasing the length of the long holes 25c of the first brackets 25 toward the outside in the longitudinal direction of the jig J can minimize the longitudinal displacement, due to adjustment, of the position of the jig main body 11 relative to the jig base 12.

In this case, by calculating the length of the long hole 25c of each first bracket 25 based on the coefficients of thermal expansion of aluminum and steel as well as the minimum temperature and the maximum temperature at which the jig J will be used, it is possible to prevent the long holes 25c from becoming longer than necessary, which would otherwise increase the size of the first bracket 25, and to prevent the second male threaded portion 28c of the connecting member 28 from interfering with an end of the long hole 25c.

Although an embodiment of the present invention is explained in detail above, the present invention can be modified in various ways without departing from the spirit and scope thereof.

For example, the embodiment illustrates an airplane main wing as the workpiece W, but the present invention is applicable to any workpiece as long as it is a long aluminum workpiece.

Furthermore, in the embodiment, the long hole 25c is formed in the first bracket 25 and the female threaded portion 27a is formed in the second bracket 27, but the positional relationship may be reversed such that a female threaded portion is formed in the first bracket 25 and a long hole is formed in the second bracket 27.

As described above, according to the present invention, when connecting the first bracket provided on the jig main body and the second bracket provided on the jig base by means of the connecting member, by screwing the first male threaded portion of the connecting member into the female threaded portion formed in one of the first and second brackets, making the second male threaded portion of the connecting member run through the long hole formed in the other of the first and second brackets, and securing the other of the first and second brackets between the flange of the connecting member and the nut screwed around the second male threaded portion, the jig main body can be firmly supported on the jig base. In this process, the inclination of the jig main body relative to the jig base can be adjusted as desired by changing the extent to which the first male threaded portion of each of the connecting members is screwed in. Further, even when the jig main body and jig base thermally expand by different amounts in the longitudinal direction due to a change in temperature, since the second male threaded portions of the connecting members move within the long holes formed in the other of the first and second brackets, the difference in the amount of thermal expansion can be absorbed, thereby preventing distortion or warpage of the jig main body.

With this mechanism, the difference in the amount of thermal expansion between the jig main body and the jig base can be compensated for to ensure the flatness of the jig main body thereby improving the assembly precision of the workpiece, even when the jig base is made of inexpensive steel and only the jig main body for supporting the workpiece is made of aluminum to reduce the cost.

Further, according to the present invention, since the long holes of the first brackets close to longitudinally opposite ends of the jig main body and the jig base are made longer than the long holes of the first bracket close to the longitudinal center, even after the difference in the amount of thermal expansion between the jig main body and the jig base is absorbed, the displacement in the longitudinal relative positional relationship between the jig main body and the jig base can be minimized.

Still further, according to the present invention, since the length of the long hole is set based on the difference in coefficients of thermal expansion between aluminum and steel as well as the predetermined difference in temperature, it is possible to prevent the second male threaded portion of the connecting member from interfering with an end of the long hole without making the length of the long hole longer than necessary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A workpiece assembly jig including an aluminum jig main body for mounting thereon and assembling a long workpiece (W), and a steel jig base supporting the jig main body from below, the workpiece assembly jig comprising:
   a plurality of first brackets provided around the perimeter of the jig main body;
   a plurality of second brackets provided around the perimeter of the jig base so as to face a lower surface of the first brackets; and
   connecting members having first and second male threaded portions extending in opposite directions from a middle flange, the connecting members connecting the first and second brackets;
   wherein the first male threaded portion of the connecting member is screwed into a female threaded portion formed in one of the first and second brackets, and the second male threaded portion of the connecting member runs through a long hole longitudinally formed in the other of the first and second brackets which is secured between the flange of the connecting member and a nut screwed around the second male threaded portion.

2. The workpiece assembly jig according to claim 1, wherein the long holes of the first brackets close to longitudinally opposite ends of the jig main body and the jig base are made longer than the long holes of the first brackets close to the longitudinal center.

3. The workpiece assembly jig according to claim 2, wherein the length of the long hole is set based on a difference in coefficients of thermal expansion between aluminum and steel as well as a predetermined difference in temperature.

4. The workpiece assembly jig according to claim 1, wherein said jig main body includes a first longitudinal frame and a second longitudinal frame with a plurality of lateral frames connected between said first and second longitudinal frames for securing the first and second longitudinal frames relative to each other.

5. The workpiece assembly jig according to claim 4, and further including workpiece support members extending between said first and second longitudinal frames for mounting a workpiece relative to the jig main body.

6. The workpiece assembly jig according to claim 4, wherein each of said first and second longitudinal frames are formed of a predetermined thickness having an outer perimeter and an inner perimeter displaced a predetermined distance relative to said outer perimeter and said plurality of first brackets being provided around the outer perimeter of said first and second longitudinal frames and said plurality of first brackets being provided around the inner perimeter of said first and second longitudinal frames and said connecting members being operatively connected between the first and second brackets for mounting the jig main body relative to the jig base.

7. The workpiece assembly jig according to claim 1, wherein said jig base includes a jig main body support and a carriage mounted below said jig main body support.

8. The workpiece assembly jig according to claim 7, and further including a plurality of casters mounted on said carriage for enabling selective movement of said workpiece assembly jig for positioning said workpiece assembly jig in a desired location.

9. The workpiece assembly jig according to claim 7, and further including a plurality of outriggers mounted on said carriage for manually being adjusted for selectively supporting said workpiece assembly jig in a fixed location.

10. A workpiece assembly jig comprising:
   a jig main body for supporting a workpiece (W);
   a jig base operatively connected to said jig main body for supporting the jig main body from below;
   a plurality of first brackets provided on the jig main body;
   a plurality of second brackets provided on the jig base, said plurality of second brackets being individually aligned with a respective one of said plurality of first brackets; and
   connecting members extending between respective aligned first and second brackets for connecting respective first and second brackets relative to each other;
   wherein at least one of said first and second brackets includes an elongated aperture and the connecting members extend through respective first and second brackets enables selective adjustment of said jig main body relative to said jig base, and
   wherein the elongated aperture in the first brackets close to longitudinally opposite ends of the jig main body and the jig base are made longer than the elongated aperture in the first brackets close to the longitudinal center.

11. The workpiece assembly jig according to claim 10, wherein the length of the elongated aperture is set based on a difference in coefficients of thermal expansion between aluminum and steel as well as a predetermined difference in temperature.

12. The workpiece assembly jig according to claim 10, wherein said jig main body includes a first longitudinal frame and a second longitudinal frame with a plurality of lateral frames connected between said first and second longitudinal frames for securing the first and second longitudinal frames relative to each other.

13. The workpiece assembly jig according to claim 12, and further including workpiece support members extending between said first and second longitudinal frames for mounting a workpiece relative to the jig main body.

14. The workpiece assembly jig according to claim 12, wherein each of said first and second longitudinal frames are formed of a predetermined thickness having an outer perimeter and an inner perimeter displaced a predetermined distance relative to said outer perimeter and said plurality of first brackets being provided around the outer perimeter of said first and second longitudinal frames and said plurality of first brackets being provided around the inner perimeter of said first and second longitudinal frames and said connecting members being operatively connected between the first and second brackets for mounting the jig main body relative to the jig base.

15. The workpiece assembly jig according to claim 10, wherein said jig base includes a jig main body support and a carriage mounted below said jig main body support.

16. The workpiece assembly jig according to claim 15, and further including a plurality of casters mounted on said carriage for enabling selective movement of said workpiece assembly jig for positioning said workpiece assembly jig in a desired location.

17. The workpiece assembly jig according to claim 15, and further including a plurality of outriggers mounted on said carriage for manually being adjusted for selectively supporting said workpiece assembly jig in a fixed location.

18. The workpiece assembly jig according to claim 10, wherein said jig main body is constructed of aluminum.

19. The workpiece assembly jig according to claim 10, wherein said jig base is constructed of steel.

20. A workpiece assembly jig comprising:
   a jig main body for supporting a workpiece (W);
   a jig base operatively connected to said jig main body for supporting the jig main body from below;
   a plurality of first brackets provided on the jig main body;
   a plurality of second brackets provided on the jig base, said plurality of second brackets being individually aligned with a respective one of said plurality of first brackets; and
   connecting members extending between respective aligned first and second brackets for connecting respective first and second brackets relative to each other;
   wherein at least one of said first and second brackets includes an elongated aperture and the connecting members extend through respective first and second brackets enables selective adjustment of said jig main body relative to said jig base, and
   wherein said jig main body includes a first longitudinal frame and a second longitudinal frame with a plurality of lateral frames connected between said first and second longitudinal frames for securing the first and second longitudinal frames relative to each other.

* * * * *